United States Patent Office 3,101,336
Patented Aug. 20, 1963

3,101,336
HETEROCYCLIC SUBSTITUTED BIGUANIDES AND CYANOGUANIDINES
John William James, Langley, and Leslie Frederick Wiggins, Wargrave, England, assignors to Aspro-Nicholas Limited, London, England, a British company
No Drawing. Filed Jan. 28, 1959, Ser. No. 789,522
Claims priority, application Great Britain Feb. 3, 1958
11 Claims. (Cl. 260—268)

This invention relates to new heterocyclic compounds which show bactericidal activity, and relates also to new heterocyclic compounds which can be employed as intermediates in the preparation of the aforesaid new heterocyclic compounds. This invention further relates to a method for preparing the new heterocyclic compounds and to a method for preparing the intermediates therefor.

According to one aspect of the present invention, there is provided a new heterocyclic compound of the general formula:

$$R-NH-\underset{\underset{NH}{\|}}{C}-NH-\underset{\underset{NH}{\|}}{C}-\left[NH-(CH_2)_{n'}\right]_p-N\underset{H\ R_3\ H\ R_4}{\overset{H\ R_1\ H\ R_2}{\diagup}}N-\left[(CH_2)_n-NH\right]_q-\underset{\underset{NH}{\|}}{C}-NH-\underset{\underset{NH}{\|}}{C}-NH-R$$

$$\underset{H\ R_3\ H\ R_4}{\overset{H\ R_1\ H\ R_2}{\diagup}}N-\left[(CH_2)_n-NH\right]_q-\underset{\underset{NH}{\|}}{C}-NH-\underset{\underset{NH}{\|}}{C}-NH-R$$

Formula 1 wherein R represents an aryl group, which may be substituted by one or more or any combination of alkyl, aryl, aralkyl, alkaryl, alkoxy and nitro groups and halogen atoms; X is oxygen, $R_5$—N< or $$R-NH-\underset{\underset{NH}{\|}}{C}-NH-\underset{\underset{NH}{\|}}{C}-\left[NH-(CH_2)_n\right]_p-N\diagdown$$

$R_1$, $R_2$, $R_3$, $R_4$ and $R_5$, which may be the same or different, are hydrogen or an alkyl group containing not more than four carbon atoms; $n$ is an integer of from 2 to 6 and the polymethylene chain may be interrupted by an oxygen atom; and wherein $p$ and $q$, which may be the same or different, are 0 or 1.

According to another aspect of the present invention, there is provided a new heterocyclic compound useful as an intermediate in the preparation of the compounds of Formula 1 above and having the general formula:

$$\underset{H\ R_3\ H\ R_4}{\overset{H\ R_1\ H\ R_2}{\diagup}}N-\left[(CH_2)_n-NH\right]_q-\underset{\underset{NH}{\|}}{C}-NH-CN$$

Formula 2 wherein Z is oxygen, $R_5$—N< or $$NC-NH-\underset{\underset{CH}{\|}}{C}-\left[NH(CH_2)_n\right]_p-N\diagdown$$

and $R_1$, $R_2$, $R_3$, $R_4$, $R_5$, $n$, $p$ and $q$ have the same meaning as in Formula 1 and wherein the polymethylene chain may be interrupted by an oxygen atom.

In Formula 1 above, when X is oxygen, the compounds have the general formula:

$$\underset{H\ R_3\ H\ R_4}{\overset{H\ R_1\ H\ R_2}{\diagup}}O\diagdown N-\left[(CH_2)_n-NH\right]_q-\underset{\underset{NH}{\|}}{C}-NH-\underset{\underset{NH}{\|}}{C}-NH-R$$

Formula 3 and when X is $R_5$—N<, the compounds have the general formula:

$$R_5-N\diagdown\overset{H\ R_1\ H\ R_2}{\diagup}N-\left[(CH_2)_n-NH\right]_q-\underset{\underset{NH}{\|}}{C}-NH-\underset{\underset{NH}{\|}}{C}-NH-R$$

Formula 4 whilst when X is $R-NH-\underset{\underset{NH}{\|}}{C}-NH-\underset{\underset{NH}{\|}}{C}-\left[NH-(CH_2)_n\right]_p-N\diagdown$ the compounds have the general formula:

$$R-NH-\underset{\underset{NH}{\|}}{C}-NH-\underset{\underset{NH}{\|}}{C}-\left[NH-(CH_2)_{n'}\right]_p-N\underset{H\ R_3\ H\ R_4}{\overset{H\ R_1\ H\ R_2}{\diagup}}N-\left[(CH_2)_n-NH\right]_q-\underset{\underset{NH}{\|}}{C}-NH-\underset{\underset{NH}{\|}}{C}-NH-R$$

Formula 5

In Formula 2 above, when Z is oxygen, the compounds have the general formula:

$$\underset{H\ R_3\ H\ R_4}{\overset{H\ R_1\ H\ R_2}{\diagup}}O\diagdown N-\left[(CH_2)_n-NH\right]_q-\underset{\underset{NH}{\|}}{C}-NH-CN$$

Formula 6 and when Z is $R_5$—N<, the compounds have the general formula:

$$R_5-N\diagdown\overset{H\ R_1\ H\ R_2}{\diagup}N-\left[(CH_2)_n-NH\right]_q-\underset{\underset{NH}{\|}}{C}-NH-CN$$

Formula 7 whilst when Z is $$NC-NH-\underset{\underset{NH}{\|}}{C}-\left[NH(CH_2)_n\right]_p-N\diagdown$$

the compounds have the general formula:

$$NC-NH-\underset{\underset{NH}{\|}}{C}-\left[NH(CH_2)_{n'}\right]_p-N\underset{H\ R_3\ H\ R_4}{\overset{H\ R_1\ H\ R_2}{\diagup}}N-\left[(CH_2)_n-NH\right]_q-\underset{\underset{NH}{\|}}{C}-NH-CN$$

Formula 8

According to a further aspect of the present invention, there is provided a process for the manufacture of the new compounds shown in Formula 1. Thus in the case where X is oxygen or $R_5$—N<, i.e. compounds of Formulae 3 and 4 above, the compounds of Formula 1 may be prepared by the interaction of a cyanoamidino heterocyclic compound of Formula 6 or 7 with an amine of the general formula $RHN_2$, wherein R has the same meaning as in Formula 1 above.

In the case where X is $$R-NH-\underset{\underset{NH}{\|}}{C}-NH-\underset{\underset{NH}{\|}}{C}-\left[NH-(CH_2)_n\right]_p-N\diagdown$$

i.e. compounds of Formula 5, the compounds of Formula 1 may be prepared by the interaction of one molecular proportion of a bis(cyanoamidino) piperazine compound of Formula 8 with at least two molecular proportions of an amine of the general formula $RNH_2$, wherein R has the same meaning as in Formula 1.

According to yet a further aspect of the invention, there is provided a process for the preparation of the new heterocyclic compounds of Formula 2. Thus, in the case where Z in Formula 2 is oxygen or $R_5$—N<, i.e. compounds of Formulae 6 and 7, the compounds of Formula 2 may be prepared by the interaction of a heterocyclic compound of the general formula:

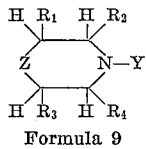

Formula 9 wherein Y is hydrogen or —$(CH_2)_n$—$NH_2$, and Z, $R_1$, $R_2$, $R_3$, $R_4$ and $n$ have the same meaning as previously defined above, with a salt of dicyanimide [H—$N(CN)_2$] in a liquid medium at atmospheric temperature or under reflux. The liquid medium, in which the reactants may be dissolved or suspended, may be, for example, water, butanol or dioxan, and the dicyanimide salt may be, for example, sodium dicyanimide.

In the case where Z in Formula 2 is

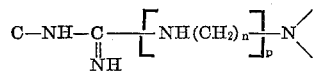

i.e. compounds of Formula 8, the compounds of Formula 2 may be prepared by the interaction of one molecular proportion of a piperazine compound of the general formula:

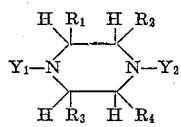

Formula 10 wherein $Y_1$ and $Y_2$, which may be the same or different, are hydrogen or —$(CH_2)_n$—$NH_2$, and $R_1$, $R_2$, $R_3$, $R_4$, and $n$ have the same meaning as hereinbefore defined, with at least two molecular proportions of a salt of dicyanimide in a liquid medium at atmospheric temperature or under reflux. The liquid medium, in which the reactants may be dissolved or suspended, may be, for example, water, butanol or dioxan, and the dicyanimide salt may be, for example, sodium dicyanimide.

The new heterocyclic compounds of Formula 1 show bactericidal activity and are useful as chemo-therapeutic, antimicrobial and anthelmintic agents. It has been found, for example, that the new compounds of Formula 1 possess very high anti-bacterial action when tested in vitro against *Staphylococcus aureus*, *Streptococccus* (group A), *Salmonella typhosum* and *Pseudomonas pyocyanea* (type I). Because of their high activity, the compounds of Formula 1 are useful for many purposes, such as in the manufacture of disinfectants and antiseptics. Thus the new compounds may be employed in the manufacture of formulations for medical, veterinary, agricultural and domestic use.

For a better understanding of the invention and to show how the same may be carried into effect, the following illustrative examples will now be given.

*Example 1*

2 g. (0.012 mol.) of 1-(cyanoamidinyl)-4-methyl piperazine hydrochloride and 2 g. (0.0122 mol.) p-chloroaniline hydrochloride are heated together under reflux with 50 mls. (0.55 mol.) 2-ethoxyethanol for four hours. The solvent is removed under reduced pressure and the residue 1 - ($N^{4'}$ - p - chlorophenylamidino - amidinyl)-4-methyl piperazine hydrochloride re-crystallised from a mixture of acetone-alcohol; melting point 235° C.

*Example 2*

5.1 g. (0.032 mol.) of 1-cyanoamidino morpholine is heated under reflux with 5.4 g. (0.033 mol.) p-chloroaniline hydrochloride in 50 mls. (0.55 mol.) 2-ethoxyethanol for four hours. The product, 1-($N^4$-p-chlorophenylamidino-amidinyl) morpholine hydrochloride is obtained by evaporation of solvent under reduced pressure and re-crystallised from ethanol; melting point 242–244° C.

*Example 3*

8.6 g. (0.039 mol.) of 1:4-bis(cyanoamidino)-piperazine and 14.0 g. (0.085 mol.) of p-chloroaniline hydrochloride are heated under reflux in 60 mls. (0.61 mol.) 2-ethoxy ethanol for four hours. The mixture is cooled, filtered and dried. The product, 1:4-bis($N^{4'}$-p-chlorophenylamidino-amidinyl)-piperazine dihydrochloride is then re-crystallised from water; melting point 274° C.

*Example 4*

4.6 g. (0.02 mol.) of 1:4-bis(cyanoamidino)-2-methyl-piperazine is heated in 30 mls. (0.3 mol.) of 2-ethoxy ethanol with 7 g. (0.042 mol.) of p-chloroaniline hydrochloride under reflux for six hours. The mixture is cooled, filtered and the residue dried. The product, 1:4-bis($N^{4'}$-p-chlorophenylamidino-amidinyl)-2-methyl piperazine dihydrochloride may be re-crystallised from aqueous 2-ethoxy ethanol; melting point 251–253° C.

*Example 5*

1.65 g. (0.0065 mol.) of 1:4-bis(cyanoamidino)-2:5-dimethyl piperazine is mixed with 2.4 g. (0.014 mol.) of p-chloroaniline hydrochloride in 50 mls. (0.52 mol.) of 2-ethoxy ethanol which is then heated to boiling for eight hours. The product 1:4-bis($N^{4'}$-p-chlorophenyl-amidinoamidinyl)-2:5-dimethyl piperazine dihydrochloride melted at 257–260° C.

*Example 6*

The condensation between 1-2'-bis(cyanoamidino)-4-aminoethyl piperazine, 5.2 g. (0.019 mol.) and p-chloroaniline hydrochloride (5.4 g.; 0.033 mol.) in 50 mls. (0.52 mol.) of 2-ethoxy ethanol was carried out in a similar way to that used in Example 3. The product 1:2'-bis($N^{4'}$-p-chlorophenylamidinoamidinyl) - 4-amino ethyl piperazine may be re-crystallised from water and has a melting point of 256–258° C.

*Example 7*

33.5 g. (0.27 mol.) 4-methyl piperazine hydrochloride and 24 g. (0.27 mol.) sodium dicyanimide are refluxed in 200 mls. butanol for eighteen hours. The product 1-(cyanoamidino) 4-methyl piperazine is obtained by filtration, washing with water and re-crystallisation from aqueous ethanol; melting point 192° C.

*Example 8*

33.5 g. (0.278 mol.) of morpholine hydrochloride and 24.1 (0.28 mol.) sodium dicyanimide are refluxed in 200 mls. of butanol for eighteen hours. The product 1-(cyanoamidino)-morpholine is obtained by filtration, washing with water and re-crystallisation from aqueous ethanol; melting point 226–227° C.

*Example 9*

47.8 g. (0.3 mol.) piperazine hydrochloride is stirred continually with 53.6 g. sodium dicyanimide (0.6 mol.) in 400 mls. (5.4 mols.) butanol under reflux for sixteen hours. The mixture is cooled, filtered, the residue dried and washed with water. The melting point of 1:4-bis-(cyanoamidino) piperazine is greater than 300° C.

Example 10

10.8 g. (0.0625 mol.) 2-methyl piperazine hydrochloride is stirred under reflux in 120 mls. (1.62 mols.) butanol with 11.2 g. (0.125 mol.) sodium dicyanimide for twelve hours. The mixture is cooled, filtered, and the residue dried before washing with water. The 1:4-bis-(cyanoamidino)-2-methyl-piperazine decomposes at temperatures in excess of 340° C.

Example 11

13.7 g. (0.074 mol.) 2:5 dimethyl piperazine hydrochloride are stirred with 13 g. (0.145 mol.) sodium dicyanimide in 120 mls. (1.62 mols.) of butanol under reflux for eighteen hours. The product is worked up as before to give 1:4-bis(cyanoamidino)-2:5-dimethyl piperazine of melting point greater than 300° C.

Example 12

The reaction between 30.3 g. (0.15 mol.) 2-aminoethyl piperazine hydrochloride and 26.7 (0.3 mol.) sodium dicyanimide is conducted as in Example 11 and gives rise to 1:2'-bis(cyanoamidino)-4-amino ethyl piperazine; melting point 241–44° C.

We claim:

1. A member selected from the group consisting of compounds having the formula:

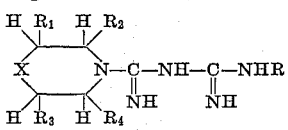

wherein R is a phenyl radical substituted by a radical selected from the group consisting of hydrogen, alkyl radicals having from 1 to 4 carbon atoms, alkoxy radicals having from 1 to 4 carbon atoms, nitro and halogen radicals; X is a radical selected from the group consisting of oxygen, $R_5$—N< and

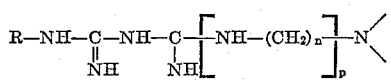

$R_1$, $R_2$, $R_3$ and $R_4$ are radicals each selected from the group consisting of hydrogen and alkyl radicals having from 1 to 4 carbon atoms; $R_5$ is an alkyl radical having from 1 to 4 carbon atoms; $n$ is an integer of from 2 to 6 and $p$ is an integer selected from the group consisting of 0 and 1.

2. 1:4 - bis($N^{4'}$ - p - chlorophenylamidino - amidinyl)-piperazine.

3. 1:2' - bis($N^{4'}$-p-chlorophenylamidino-amidinyl) - 4-amino-ethyl-piperazine.

4. A process for the preparation of a member selected from the group consisting of compounds having the formula:

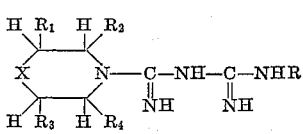

wherein R is a phenyl radical substituted by a radical selected from the group consisting of hydrogen, alkyl radicals having from 1 to 4 carbon atoms, alkoxy radicals having from 1 to 4 carbon atoms, nitro and halogen radicals; X is a radical selected from the group consisting of oxygen, $R_5$—N< and

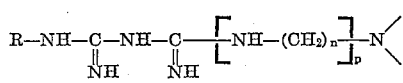

$R_1$, $R_2$, $R_3$ and $R_4$ are radicals each selected from the group consisting of hydrogen and alkyl radicals having from 1 to 4 carbon atoms; $R_5$ is an alkyl radical having from 1 to 4 carbon atoms; $n$ is an integer of from 2 to 6 and $p$ is an integer selected from the group consisting of 0 and 1, which process comprises heating under reflux in an inert organic liquid reaction medium a heterocyclic substituted cyanoguanidine of the general formula:

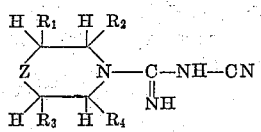

wherein Z is a radical selected from the group consisting of oxygen, $R_5$—N< and

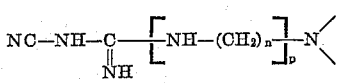

and $R_1$, $R_2$, $R_3$, $R_4$, $R_5$, $n$ and $p$ have the same meaning as defined above, with an amine of the general formula $RNH_2$, wherein R has the same meaning as defined above, to form the desired heterocyclic substituted biguanide.

5. A member selected from the group consisting of compounds having the formula:

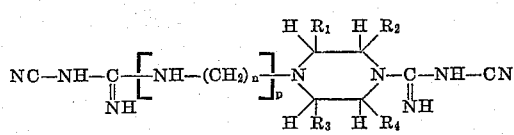

wherein $R_1$, $R_2$, $R_3$ and $R_4$ are radicals each selected from the group consisting of hydrogen and alkyl radicals having from 1 to 4 carbon atoms, $n$ is an integer of from 2 to 6 and $p$ is an integer selected from the group consisting of 0 and 1.

6. A process for the preparation of a member selected from the group consisting of compounds having the formula:

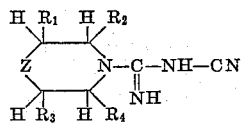

wherein Z is a radical selected from the group consisting of oxygen, $R_5$—N< and

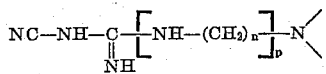

$R_1$, $R_2$, $R_3$ and $R_4$ are radicals each selected from the group consisting of hydrogen and alkyl radicals having from 1 to 4 carbon atoms; $R_5$ is an alkyl radical having from 1 to 4 carbon atoms; $n$ is an integer of from 2 to 6 and $p$ is an integer selected from the group consisting of 0 and 1, which process comprises heating under reflux in an inert organic liquid reaction medium an inorganic acid salt of a heterocyclic amine of the formula:

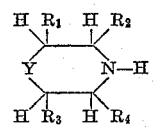

wherein Y is a radical selected from the group consisting of oxygen, $R_5$—N<, H—N< and $H_2N$—$(CH_2)_n$—N<, and $R_1$, $R_2$, $R_3$, $R_4$, $R_5$ and $n$ have the same meaning as defined above, with a metal salt of dicyanimide to form the desired heterocyclic substituted cyanoguanidine.

7. A process according to claim 6, wherein the metal salt of dicyanimide is sodium dicyanimide.

8. A compound according to claim 1, wherein R is a phenyl radical substituted by a halogen radical and X is

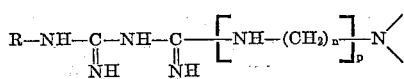
$n$ and $p$ having the meanings defined in claim 1.
9. A compound according to claim 8, wherein R is a p-chlorophenyl radical.
10. The heterocyclic substituted cyanoguanidine having the formula:
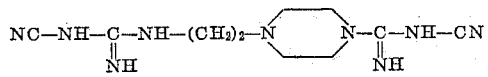
11. The heterocyclic substituted cyanoguanidine having the formula:
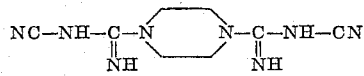
References Cited in the file of this patent
UNITED STATES PATENTS
| | | |
|---|---|---|
| 2,295,884 | Winnek | Sept. 15, 1942 |
| 2,320,882 | Oldham | June 1, 1943 |
| 2,455,807 | Redmon et al. | Dec. 7, 1948 |
| 2,455,896 | Nagy | Dec. 7, 1948 |